(12) United States Patent
Karim et al.

(10) Patent No.: US 9,774,204 B2
(45) Date of Patent: Sep. 26, 2017

(54) ELECTRICALLY RECHARGEABLE, DUAL CHEMISTRY, BATTERY SYSTEM FOR USE IN PLUG-IN OR HYBRID ELECTRIC VEHICLES

(71) Applicants: Nad Karim, Palo Alto, CA (US); Elton J Cairns, Walnut Creek, CA (US); Paul H Vroomen, Santa Cruz, CA (US)

(72) Inventors: Nad Karim, Palo Alto, CA (US); Elton J Cairns, Walnut Creek, CA (US); Paul H Vroomen, Santa Cruz, CA (US)

(73) Assignee: Nad Karim, Palo Alto, CA (US)

( * ) Notice: Subject to any disclaimer, the term of this patent is extended or adjusted under 35 U.S.C. 154(b) by 821 days.

(21) Appl. No.: 13/693,038

(22) Filed: Dec. 3, 2012

(65) Prior Publication Data

US 2013/0141045 A1 Jun. 6, 2013

Related U.S. Application Data

(60) Provisional application No. 61/566,143, filed on Dec. 2, 2011, provisional application No. 61/720,484, filed on Oct. 31, 2012.

(51) Int. Cl.

| | |
|---|---|
| *H02J 7/00* | (2006.01) |
| *H02J 1/10* | (2006.01) |
| *H02J 3/32* | (2006.01) |
| *B60W 10/24* | (2006.01) |
| *B60L 11/18* | (2006.01) |

(52) U.S. Cl.
CPC .............. *H02J 7/0068* (2013.01); *B60L 11/18* (2013.01); *B60L 11/1861* (2013.01);
(Continued)

(58) Field of Classification Search
CPC ...................................................... H02J 7/0068
(Continued)

(56) References Cited

U.S. PATENT DOCUMENTS

| 7,049,792 B2 | 5/2006 | King | |
|---|---|---|---|
| 8,063,609 B2 * | 11/2011 | Salasoo ................. | B60L 3/0046 320/103 |

(Continued)

FOREIGN PATENT DOCUMENTS

| IN | WO2011114349 | * 9/2011 |
|---|---|---|
| JP | 2011-229288 A | 11/2011 |

(Continued)

OTHER PUBLICATIONS

International Search Report for PCT/US2012/067657, ISA/KIPO, Mar. 25, 2013.

*Primary Examiner* — Richard V Muralidar

(57) ABSTRACT

An apparatus, method and system are disclosed, relating to a dual-chemistry battery subsystem having different battery chemistries and performance properties, and relating to an algorithm of charging and discharging the battery subsystem. For an EV application, the battery subsystem is a tailored solution that combines two different battery configurations, a first battery configuration and a second battery configuration, to satisfy the unique needs of different driving modes and performance profiles of an EV, such as a typical workday commute versus an occasional extended range trip on the weekend. The present disclosure provides intelligent control and heuristics to maximize useful energy on a wide variety of battery applications.

36 Claims, 9 Drawing Sheets

(52) U.S. Cl.
CPC ......... B60L 11/1868 (2013.01); H02J 7/0042 (2013.01); H02J 7/0054 (2013.01); H02J 7/0057 (2013.01); Y02T 10/7005 (2013.01); Y02T 10/7044 (2013.01); Y02T 10/7066 (2013.01); Y02T 90/14 (2013.01)

(58) Field of Classification Search
USPC ...... 320/103, 104, 125, 126; 307/43, 46, 48; 180/65.29
See application file for complete search history.

(56) References Cited

U.S. PATENT DOCUMENTS

| | | | |
|---|---|---|---|
| 8,180,512 B2 | 5/2012 | Kelty et al. | |
| 8,190,320 B2 | 5/2012 | Kelty et al. | |
| 8,450,974 B2 | 5/2013 | Stewart et al. | |
| 8,471,521 B2 | 6/2013 | Stewart et al. | |
| 2007/0284159 A1* | 12/2007 | Takami | B60K 6/46 180/65.1 |
| 2010/0318234 A1 | 12/2010 | Moore | |
| 2011/0156641 A1 | 6/2011 | Kishiyama et al. | |
| 2011/0181242 A1 | 7/2011 | Lee | |
| 2012/0041625 A1 | 2/2012 | Kelty et al. | |
| 2013/0181511 A1 | 7/2013 | Stewart et al. | |
| 2013/0187591 A1 | 7/2013 | Stewart et al. | |

FOREIGN PATENT DOCUMENTS

| | | |
|---|---|---|
| KR | 10-2006-0116724 A | 11/2006 |
| WO | 2011114349 A3 | 9/2011 |

* cited by examiner

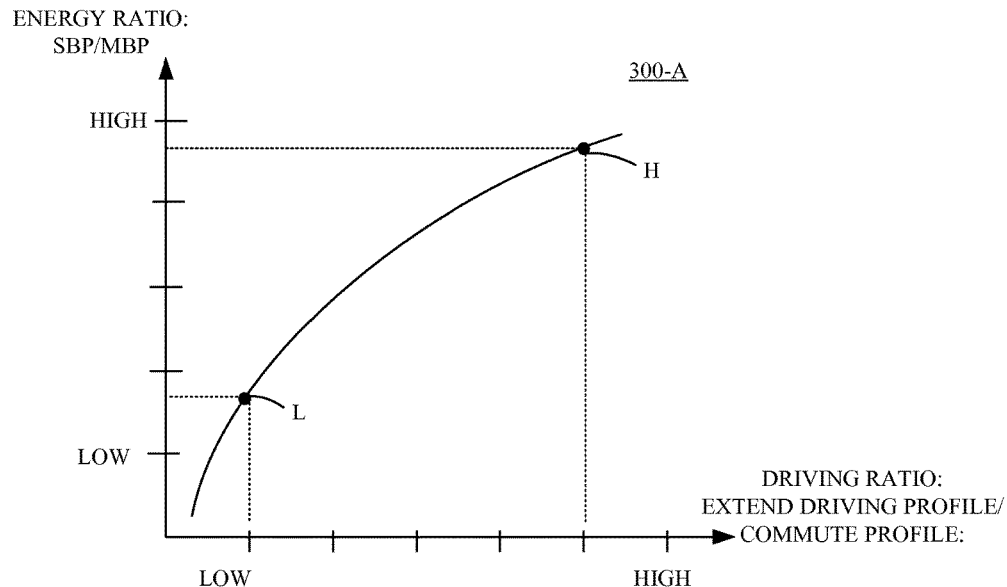
FIG. 3A
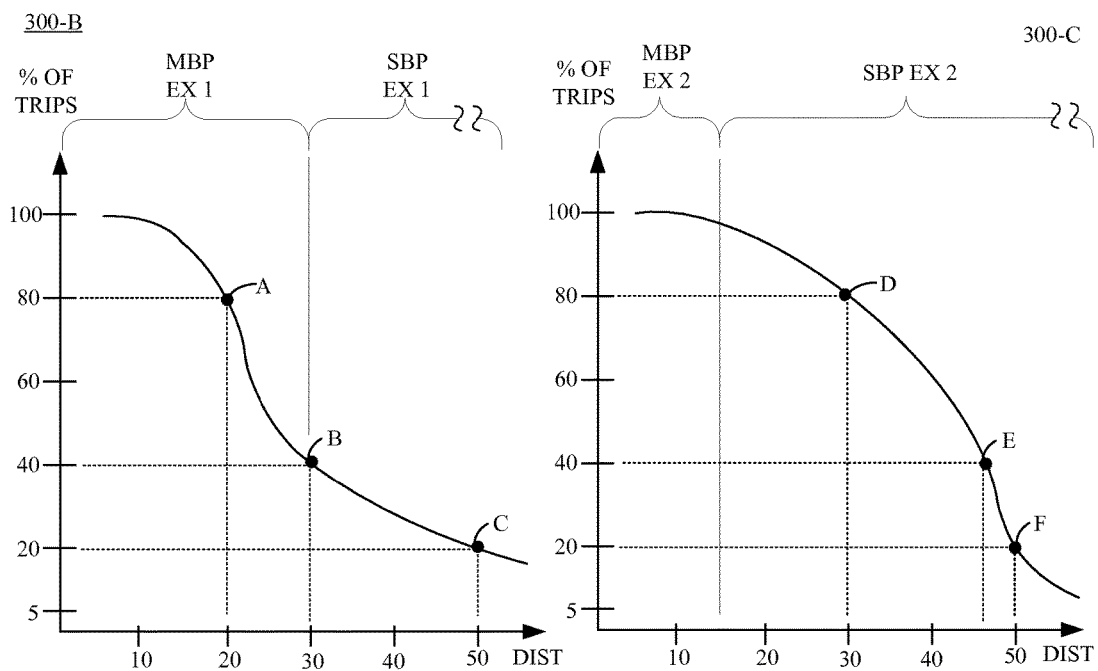
FIG. 3B          FIG. 3C

ELECTRICALLY RECHARGEABLE, DUAL CHEMISTRY, BATTERY SYSTEM FOR USE IN PLUG-IN OR HYBRID ELECTRIC VEHICLES

CROSS-REFERENCE TO RELATED APPLICATIONS

This application claims priority to provisional application(s): Ser. No. 61/566,143 filed Dec. 2, 2011, entitled "Electrically rechargeable, dual chemistry, battery system for use in plug-in electric vehicles or hybrid electric vehicles; Ser. No. 61/720,484, filed Oct. 31, 2012, also entitled "ELECTRICALLY RECHARGEABLE, DUAL CHEMISTRY, BATTERY SYSTEM FOR USE IN PLUG-IN ELECTRIC VEHICLES OR HYBRID ELECTRIC VEHICLES," which applications are also incorporated by reference herein in their entirety.

FIELD OF TECHNOLOGY

This disclosure relates generally to the technical field of electrical charging and discharging, and in one example embodiment, this disclosure relates to a method, apparatus and system of batteries.

BACKGROUND

Batteries are used to store and release energy in either a slow or a quick manner depending on the needs. Wide varieties of applications utilize batteries including mobile and stationary, vehicular and non-vehicular systems.

Batteries can have many different performance, or design, ratings to assist a user in matching the battery to an application. The application's need may be in terms of power (rate), total energy (capacity), quantity of cycling, depth of cycling, thermal characteristics, impedance, etc. or some combination of these design ratings. There are nearly always tradeoffs between the different choices of design ratings. For example, a long cycle life battery is typically costly and heavy. A high-volume consumer type battery can be inexpensive, but is typically neither high-power nor high cycling. For an EV application, there may be different demands on a battery performance that are not satisfied in a single given design. For example, one battery design may provide sufficient power for acceleration needs, but insufficient energy for extended use. While a combination of a high-energy battery with a high-power battery provides sufficient electrical resources for that single scenario, as described in U.S. Pat. No. 7,049,792, entitled "Method and apparatus for a hybrid battery configuration for use in an electric or hybrid electric motive power system," there are a wide variety of other applications and scenarios that are not satisfied by that particular combination.

SUMMARY

An apparatus, method and system are disclosed, relating to a multi-chemistry battery subsystem having different battery chemistries and performance properties, and relating to an algorithm of charging and discharging the battery subsystem. For an EV application, the battery subsystem is a tailored solution that combines two different battery configurations, a first battery configuration and a second battery configuration, to satisfy the unique needs of different driving modes and performance profiles of an EV, such as a typical workday commute versus an occasional extended range trip on the weekend. The present disclosure provides intelligent control and heuristics to maximize useful energy on a wide variety of battery applications including stationary applications, such as load balancing and backup power, mobile/terrestrial applications, such as hybrid electric vehicles (series or parallel), plug-in electric vehicles (EVs) (e.g., cars, bikes, trains, busses, etc.), and applications that are mobile/airborne, such as aircraft and drones.

A first battery configuration, called the main battery pack (MBP), is built from cells having beneficial properties of high cycle rating and low impedance that are applied to the high-power demands of accelerating from a stop and the high-cycle rate of stop and go traffic that discharge the battery and then charge the battery from regenerative braking. Because this first battery configuration also has the undesirable properties of high-weight and high-cost, the size of the first battery configuration is tailored only large enough to satisfy the more frequently traveled, nominal commute range of an EV, the portion of the EV's nominal driving profile that would need those beneficial properties.

A second battery configuration, called the supplemental battery pack (SBP), is built from cells having beneficial properties of high specific-energy, and low-cost features that are slated to power the less frequent demands of extended driving beyond the nominal commute profile. Consequently, the second battery configuration is designed as a larger size than the first battery configuration because the higher energy output for extended range driving. Because the second battery configuration is comprised of lower specific power cells, it builds more cells in parallel to satisfy the power need, thereby resulting in a larger battery form factor. Thus, both the first battery pack and the second battery pack are individually capable of providing the power and energy required by the load. Lastly, because the second battery configuration is made of a cell having a high impedance it consequently generates more heat. Thus, the second battery configuration is managed by a discharging and charging algorithm that directs all possible battery cycling to the first battery configuration, using the second battery configuration only when the first battery configuration is inadequate or depleted. Thus, the discharging and charging algorithm will rely primarily on discharging and charging the first battery configuration, or main battery pack, for the lion's share of the battery use and cycling in an EV. The MBP and the SBP are configurable to discharge in multiple different discharge modes based on their design tradeoffs and their current state, as well as the system needs. The MBP and the SBP typically operate in series or sequentially, that is one after the other, with the main battery pack providing all or nearly all the cycling until it has no charge remaining, because they both have adequate power and energy for the load. However, the multiple battery packs, MBP and SBP, can also operate in parallel for a less often scenario where the SBP has a deficit condition and is temporarily unable to supply the rated, or maximum needed current by the load, e.g., the EV motor.

By using a multi-chemistry, e.g., dual chemistry, battery subsystem that combines of the first and second battery configurations and by tailoring the size of the first and second battery configurations to the EV driving profile, several significant benefits arise. The battery subsystem is cheaper, lighter, and/or longer-lived than a theoretical equivalent single battery design that would use the chemistry/construction of either the first battery configuration or the second battery configuration. In particular, the lifespan of the second battery configuration is preserved by utilizing the second battery configuration only when the first battery configuration is essentially depleted. Fewer cycles on the second battery configuration translates into longer life, thus compensating for its substantially lower cycle rating when compared to the first battery configuration. The MBP, while called main, is not necessarily given that term because of its physical size or its capacity, because in the present embodiment the MBP is actually physically smaller and lower capacity than the SBP. Rather, the MBP is called this because it is the first, battery that is discharged, if it has any state of charge, and it is the first battery that is charged, if it has less than a full state of charge. In another embodiment, the physical size and the capacity of the MBP could be larger than the SBP, but the MBP would still be the first battery that is discharged, if it has any state of charge, and it is the first battery that is charged, if it has less than a full state of charge. The SBP is discharged only if the MBP has no charge, or has reached a threshold SoC.

As a comparison, if a theoretical single battery design were to utilize only the heavy but high-cycling first battery chemistry and construction to supply all the needs of the EV, a large portion of battery's high-cycling performance capability would be an overdesign for the infrequent extended range driving needs. Resultantly, a large portion of the single battery design would unnecessarily be using the low specific energy and the high cost of that first battery configuration, which would thusly detract from that solution.

Conversely, if an alternative theoretical single battery design were to utilize only the low cycling and low-life but high-energy second battery configuration to supply all the needs of the EV, it would have to be overdesigned in capacity to compensate for the low cycling, low-depth of discharge, and low power rating that it exhibits. That is, the single battery of the second battery configuration would have to be restricted in its depth of discharge, e.g., only to 70%, in order to avoid the low-life behavior at full depth of discharge. Thus 30% of the battery would never be usable, resulting in a life-long weight penalty to the EV of 30% of the battery weight. Similarly, the low-power aspect of the second battery configuration would require the single battery design to be oversized to provide the desired power, again resulting in an increase in size and weight.

Other features and advantages of the present disclosure will be apparent to those of ordinary skill in the art from the accompanying drawings and from the detailed description of the preferred embodiments that follows. Accordingly, the specification and drawings are to be regarded in an illustrative rather than a restrictive sense.

BRIEF DESCRIPTION OF THE VIEW OF DRAWINGS

Example embodiments are illustrated by way of example and not limitation in the figures of the accompanying drawings, in which like references indicate similar elements and in which:

FIG. 3A is a graph illustrating a relationship between an EV driving ratio and an energy ratio of a supplemental to main battery in a battery subsystem, according to one or more embodiments.

FIG. 3B is a graph illustrating a percentage of trips vs. a given range, for an exemplary short-commute/occasional extended driving pattern along with a resultant coverage provided by tailoring the main and supplemental battery pack to the driving pattern, respectively, according to one or more embodiments.

FIG. 3C is a graph illustrating a percentage of trips vs. a given range, for an exemplary long-commute/occasional extended driving pattern along with a resultant coverage provided by tailoring the main and supplemental battery pack to the driving pattern, respectively, according to one or more embodiments.

Other features of the present embodiments will be apparent from the accompanying drawings and from the detailed description that follows.

DETAILED DESCRIPTION

An apparatus, method and system that provides a dual chemistry battery (DCB) module having at least two different battery packs, with each having different battery chemistries and performance properties, and provides an algorithm of charging and discharging the battery subsystem is disclosed. For an EV application, the battery subsystem is a tailored solution that combines two different battery configurations, a first battery configuration and a second battery configuration to satisfy the unique needs of each of the two primary driving modes and performance profiles of an EV. In the following description, for the purposes of explanation, numerous specific details are set forth in order to provide a thorough understanding of the various embodiments. It will be evident, however to one skilled in the art that various embodiments may be practiced without these specific details.

Functional Block Diagram

Figure 1:
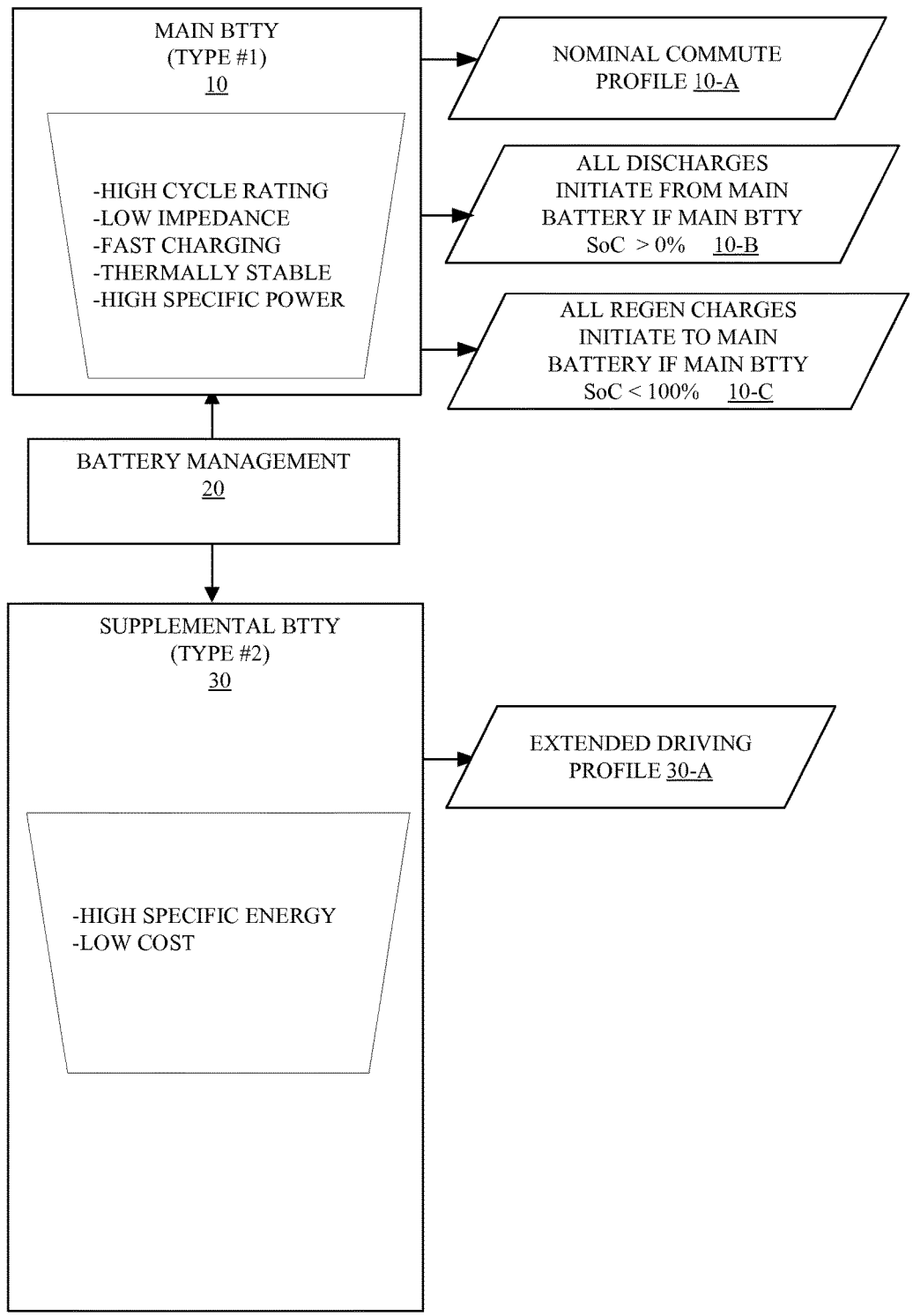
FIG. 1 is a functional block diagram of a battery subsystem having two different types of batteries that are tailored to two different roles in an electric vehicle (EV), according to one or more embodiments.

Referring now to FIG. 1, a functional block diagram of a battery subsystem 100 having two different types of traction batteries that are tailored respectively to two different roles in an electric vehicle (EV) is shown, according to one or more embodiments. The battery subsystem 100 is comprised of at least two different battery packs having different chemistry and/or construction types that provide distinctive tradeoffs to each other in terms of battery design ratings and properties. These tradeoffs can be tailored to a given application's needs in a manner that results in a tuned system with improved performance, lower weight, improved reliability, improved safety, and/or lower cost than a battery system that provides an essentially homogenous single-type of battery construction. In the present embodiment, the battery subsystem 100 has a main battery 10 that has a type #1 of construction and chemistry that provides one or more of the following properties in a wide variety of combinations: high cycle rating; low impedance; fast charging; thermally stable; high specific power. The present embodiment also provides supplemental battery pack 30 that has a type #2 of construction and chemistry that provides one or more of the following properties in many possible combinations: low cycle rating, high impedance, slow charging, high specific energy, and/or low cost. In one embodiment, all the battery design ratings shown apply to the respective type of battery shown, with type #1 main battery 10, e.g., MBP, being a lithium titanate oxide (LiTi2O3, or LTO) battery, and type #2 supplemental battery 30, e.g., SBP, being a lithium cobalt oxide (LiCoO2) battery. However, a wide range of battery types can be applied to the module with segregated battery pack tailoring as shown. Battery management function 20, arbitrates between the two sources of power, to decide when either of the batteries will provide the load, based on their design tradeoffs and their current state, as well as the system needs.

In the present embodiment, main battery 10 is tailored for a function 10-A of a nominal commute profile with additional specific exemplary functions such as: function 10-B wherein all discharges initiate form the main battery (BTTY) if the main battery is not fully charged, e.g., if the main battery has a state of charge (SoC) that is greater than approximately zero percent (0%); and such as function 10-C wherein all regenerative (REGEN) charges initiate to the main battery if the main battery is not approximately fully charged, e.g. if the main battery has a SoC that is less than approximately one-hundred percent (100%). In addition supplemental battery 30 is tailored for a function 30-A of an extended driving profile. That is, main battery 10 is a high cycle rating, low impedance, thermally stable battery that makes it a long lasting and naturally durable good for the EV in comparison to the supplemental battery with its low cycle rating, high impedance, and low cost, e.g., low cost/kWh, making it a replaceable wear out part. The following figures and descriptions provide the qualitative and quantitative standards for tailoring which of the different battery types will apply to which of the different loads and applications in an energy management system, e.g., an EV, and the ratio of capacity of the different battery types that results in a tuned system with improved performance, lower weight, improved reliability and longevity, improved safety, and/or lower cost.

Architecture

Figure 2:
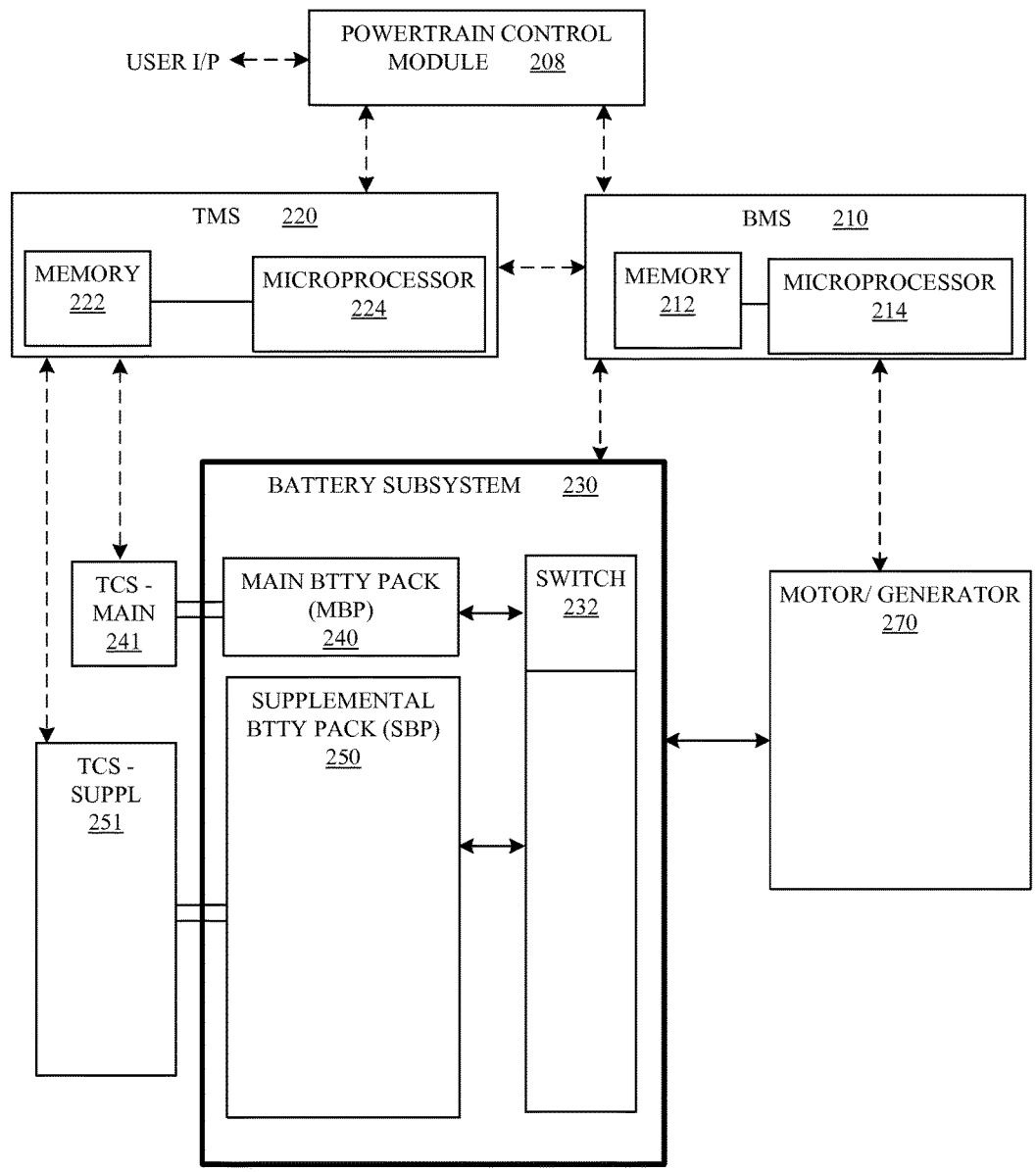
FIG. 2 is a block diagram of an energy management system for an EV using two different types of batteries, according to one or more embodiments.

Referring now to FIG. 2, a block diagram of an energy management system 200 for an EV using two different types of traction batteries is shown, according to one or more embodiments. The EV application can be a car, bike, motorcycle, aircraft, or any other mobile application where cost, weight, and/or reliability and longevity are factors to consider in the design of a battery system. Energy management system is also applicable to other non-mobile applications such as load balancing systems, etc.

Battery subsystem 230 includes a main battery pack (MBP) 240 and a supplemental battery pack (SBP) 250 coupled in parallel to a switch 232 that is itself coupled to a motor/generator 270. In the present embodiment, MBP 240 and SBP 250 are neither coupled to each other nor transfer charge between each other per se, e.g., via switch 232. Rather switch 232 is a power electronics device, such as an insulated gate bi-polar junction transistor (BJT), thyristor, silicon controlled rectifier (SCR), or the like, that is configurable to switch an electrical connection between motor/generator 270 and MBP 240 and/or SBP 250, as well as pulse width modulate each of MBP 240 and/or SBP 250 for desired current conducted between MBP 240 and SBP 250 and motor/generator 270, e.g., either in a battery charge or a discharge mode. In one mode, switch 232 is configured to provide a serial transfer of power from MBP 240 or SBP 250 to motor/generator 270, while in another embodiment, switch 232 provide parallel coupling of MBP 240 and SBP 250 to motor/generator 270 for a parallel transfer of power.

Battery subsystem 230 is controlled by a battery management system (BMS) 210, which has a memory 212, capable of storing data and instructions, that is coupled to a microprocessor, or microcontroller 214, that is capable of receiving input variables, such as sensor data re: battery SoC and current rates, and then execute instructions to enable an algorithmic control of the discharging and charging of the MBP 240 and SBP 250, examples of said algorithms being provided hereinafter in flowchart figures. BMS 210 is coupled to motor/generator 270, battery subsystem 230, TMS 220, and powertrain control module (PCM) 208 in order to receive data and instructions and provide control of said components, as appropriate to satisfy the functionality of the energy management system 200.

A thermal management system (TMS) 220 is coupled to a thermal control system for main battery pack (TCS-MAIN) 241 and to thermal control system for supplemental battery pack (TCS-SUPPL) 251, which are in turn, coupled to MBP 240 and SBP 250, respectively. The TCS-MAIN 241 and TCS-SUPPL 251 are a heating/cooling system to bring the MBP and SBP to a temperature at which they can provide sufficient current safely. TMS 220 also has a memory 222, capable of storing data and instructions, that is coupled to a microprocessor, or microcontroller 224, that is capable of receiving input variables, such as sensor data re: battery and system temperatures, and then execute instructions to control TCS-MAIN 241 and/or TCS-SUPPL 251 to maintain safe temperatures and prevent thermal runaway of MBP 240 and/or SBP 250, though SBP 250 is the battery design more likely to have a thermal issue, because it may be less stable and has relatively high impedance.

The TCS-SPPL 251 and TCS-MAIN 241 are independently operated in the present embodiment, are autonomous from each other, but are controlled commonly by TMS 220.

In one embodiment, TCS-MAIN 241 is an air cooled passive system with at least one temperature sensor that reads the temperature of MBP 240 in one or more locations and communicates sensor information to the TMS 220. In the same embodiment, TCS-SUPP 251 is a liquid cooled active system with at least one temperature sensor that reads the temperature of SBP 250 in one or more locations and communicates sensor information to the TMS 220. In turn, TMS 220 is coupled to BMS 210 to provide temperature input in case of an over temperature situation which would allow the BMS to reduce or cease discharging or charging to MBP 240 or SBP 250. TCS-MAIN 241 is air cooled because it is sufficiently safe for MBP 240 that is designed with a low impedance and thermally stable battery cell design. TCS-SUPP 251 is water cooled because SBP 250 is designed with a high-impedance, thermally less stable battery cell that requires a larger capacity cooling to keep it safe from a thermal runaway condition. Thus, the present system 200 uses a dual cooling system (DCS) that complements the needs of the DCB configuration. Control and sensing lines are shown as dashed lines, the power transfer lines are shown as sold lines, and cooling lines are shown as double lines. PCM 208 provides an interface with the powertrain needs, the user input, such as throttle position, etc., as well as the controller area network bus (CAN bus) interaction and communication with other vehicular systems.

In an alternative configuration, MBP 240 can be designed for thermodynamics (DFTh) by having the cool and low impedance battery located in the middle of the battery subsystem 230, with the minimal amount of exposed surface area, and surrounded by the SBP 250 which would then have the maximum amount of surface area as the circumferentially-located batteries in the battery subsystem 230. This is an acceptable configuration to the extent that the SBP 250 is controlled during charge and discharge, as well as with the TCS-SUPPL 251 to prevent overheating of the MBP 240, which may be the more expensive component of the battery subsystem 230.

Ratios of Main to Supplemental Battery Packs

Referring now to FIG. 3A, a graph 300-A illustrating a relationship between an EV driving ratio and an EV energy ratio of a supplemental to main battery in a battery subsystem is shown, according to one or more embodiments. The independent variable on the horizontal axis is a qualitative dimensionless driving ratio, ranging from low to high, which is equal to an extended driving profile divided by a commuting profile. The dependant variable on the vertical axis is a qualitative dimensionless energy ratio, also ranging from low to high, which is equal to the energy rating of the supplemental battery pack divided by the energy rating of the main battery pack. As an example, a low point L represents a low driving ratio, meaning that for this particular scenario either the extended driving profile is low, e.g., it does not make up a high percentage of the trips made by the EV, or the commute profile is high, e.g. the EV makes a high percentage of trips that are short commute trips, or both. The corresponding best DCB module for point L driving ratio would be a low energy ratio DCB module, with a supplemental battery having a lower energy rating than a main battery. In other words, the DCB module would be high cycling focused because of the driving profile. While this point defines the relationship between the MBP and the SBP, the actual quantitative values of the MBP and SBP would depend upon a given EV weight, and the average and peak commute miles driven. From there the size of SBP can be determined as the one remaining variable. A similar analysis is performed for point H, which represents a driving profile that has much higher percent of trips as extended range as compared to the short-distance commute cycle.

In lieu of a customized DCB module for each discrete user, several main demographic clusters of driving profiles can provide several EV variants that cater to the given profiles, e.g., the short-commuter, the mixed commuter-extended, and the long-range. This arrangement would allow a user to purchase a vehicle that is more closely tailored to their driving profile. The EV model would be designed with a common floorpan for the multiple variants to fit batteries with different ratios, and allow a user to swap-out the DCB pack if a change in the driving profile arises.

Driving Scenarios

Referring now to FIG. 3B, a graph 300-B illustrating a percentage of trips vs. a given range, for an exemplary short-commute/occasional extended driving pattern along with a resultant coverage provided by tailoring the main and supplemental battery pack to the driving patterns, respectively is shown, according to one or more embodiments. For both FIGS. 3B and 3C, the horizontal axis represents the distance traveled in a given trip, while the vertical axis represents the percentage (%) of trip made at that given distance or greater. Point A in FIG. 3B indicates that 80% of the trips made by the present driving profile have a distance of 20 miles or more, while point B shows that 40% of the trips have a distance of 30 miles or more, and finally point C shows that only 20% of the trips are 50 miles or more. Stated conversely, point B shows that 60% of the trips have a distance of 30 miles or less, an ideal profile for being the capacity target for the MBP, with the balance of the extended range being sized for the SBP.

Referring now to FIG. 3C, a graph 300-C illustrating a percentage of trips versus a given range, for an exemplary long-commute/occasional extended driving pattern along with a resultant coverage provided by tailoring the main and supplemental battery pack to the driving patterns, respectively is shown, according to one or more embodiments. In comparison to FIG. 3B, driving profile in FIG. 3C is clearly shifted to a having higher percentages at a long range driving. Specifically, point D shows that 80% of the trips are more than 30 miles, while point E shows that 40% of the trips have a distance of 45 miles or more, and 20% of the trips are 50 miles or more. Thus, points D and E are 50% greater than the similar percentage points on FIG. 3B. If the longer distances are related to less stop and go traffic, and thus regen charging, providing a nominally sized MBP with high cycling capability will reduce cost of the system, and avoid overdesigning the high-cycling battery capacity.

Battery Charging/Discharging Scenarios

Figure 4A:
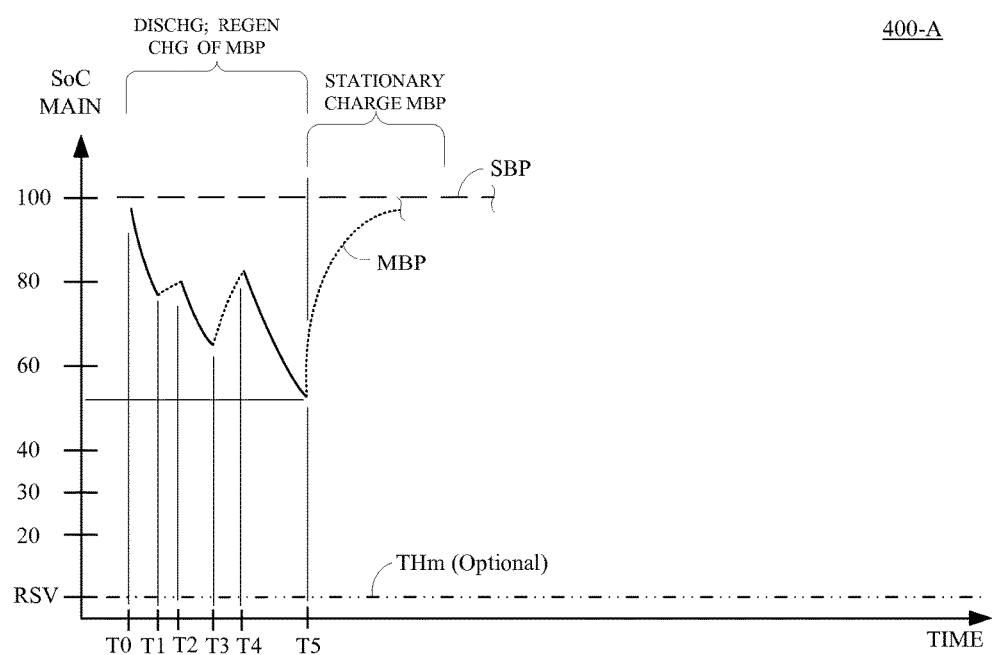
FIG. 4A is a time vs. state of charge (SoC) graph of the main and supplemental battery packs for a hypothetical single-trip driving scenario that discharges and regeneratively recharges only the main battery pack, according to one or more embodiments.

Referring now to FIG. 4A, a time vs. state of charge (SoC) graph 400-A of the main and supplemental battery packs for a hypothetical single-trip driving scenario that discharges and regeneratively recharges only the main battery pack is shown, according to one or more embodiments. SBP and MBP both have an essentially fully charged condition at time T0. From T0 to T5, the MBP is discharged, as shown by the negative slope curve, and regeneratively charged, at intermittent bands, with the regenerative curve having a positive slope. The driving finally terminating at time T5 with an approximate 52% SoC prior to receiving stationary charging of the MBP. During the nominal duration of the nominal trip, the entire schedule of cycling was absorbed by the MBP, which is designed to handle it. In contrast, the SBP never received any discharge or charge, thus appearing as a flat line at 100% SoC. Consequently, because the SBP has a lower cycle rating, the SBP does not see any of its more limited cycling-lifespan consumed, and thus it is preserved for the potential of providing a discharge in a future extended range scenario.

Figure 4B:
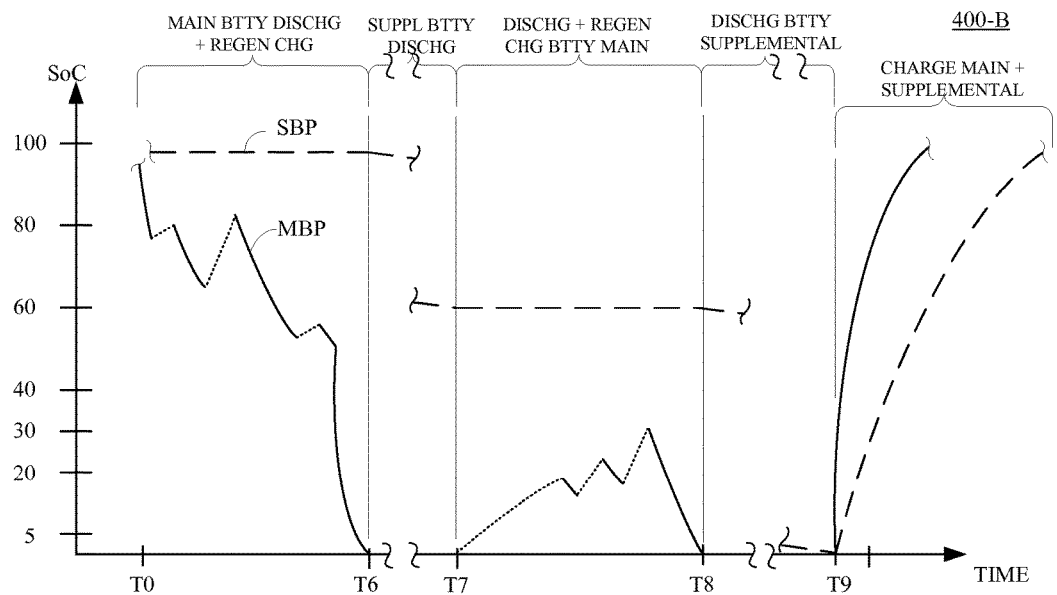
FIG. 4B is a time vs. state of charge (SoC) graph of the main and supplemental battery packs for a hypothetical single-trip driving scenario that discharges the main battery pack to a fully discharged state first, and then drives the supplemental pack to a fully discharged state, according to one or more embodiments.

Referring now to FIG. 4B, a time vs. state of charge (SoC) graph 400-B of the main and supplemental battery packs for a hypothetical single-trip driving scenario that discharges the main battery pack from a fully charged state to a fully discharged state first, and then drives the supplemental pack from a fully charged state to a fully discharged state is shown, according to one or more embodiments. From time T0 to T6, all the cycling is absorbed by the MBP until the SoC shows the MBP has finally been fully consumed. Only at that point, does the SBP start discharging, shown as a broken line because of the low discharge rate (aka, C-rate), at time T6, from its fully charged state (100% SoC), through T7 where it reaches an approximately 60% SoC. From T7 through T8, regenerative charging opportunities are presented to the battery subsystem, but those regen charging opportunities are all absorbed by MBP, per the charging algorithm, because the MBP is below a full state of charge. From T8 to T9, all the discharge comes from the SBP, shown as a broken line because of the low discharge rate, because the MBP is fully depleted. At time T9, the SBP is also fully depleted. Both the SBP and the MBP enter a stationary charging operation, where they can be charged in parallel as shown. Thus, the DCB system allows for the full discharge of the MBP and the SBP in order to benefit from propulsion provided by the total capacity of the batteries. The lifespan operation of the SBP is maintained, even though its cycle rating is a fraction of the MBP cycle rating, because it is only cycled a fraction of the number of cycles the MBP receives, e.g., since most of the MBP cycles represent those in FIG. 4A. Thus, the EV with a DCB does not resultantly haul 30% of battery capacity, like a low cycling rate single-chemistry battery pack would, in order to maintain its expected life cycle through 100,000 miles of EV driving.

Figure 4C:
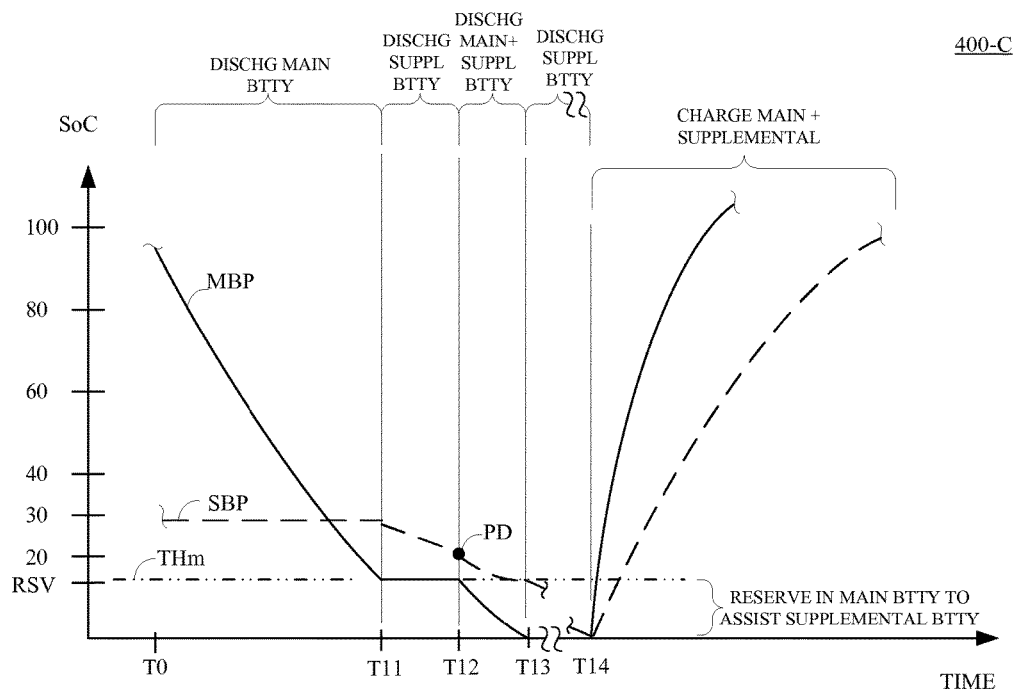
FIG. 4C is a time vs. state of charge (SoC) graph of the main and supplemental battery packs for a hypothetical single-trip driving scenario that only discharges the main battery pack to a threshold state of charge to retain a reserve capacity in the main battery pack that can compensate for a power deficit in the supplemental battery pack, according to one or more embodiments.

Referring now to FIG. 4C, a time vs. state of charge (SoC) graph 400-C of the main and supplemental battery packs for a hypothetical single-trip driving scenario that only discharges the main battery pack to a threshold state of charge to retain a reserve capacity in the main battery pack that can compensate for a power deficit in the supplemental battery pack is shown, according to one or more embodiments. Note that SBP SoC starts at 30% at time T0, while MBP SoC at T0 is approximately 95%, thus illustrating that MBP is prioritized to receive regen charging, and thus may often times have a SoC that is higher than the SBP. From time T0 to T11, MBP is discharged down to an optional threshold, "THm", which is set arbitrarily at a default or a user-programmed reserve (RSV) SoC. Beyond T11, MBP does not discharge because SBP can be discharged without encountering a power deficit that would request additional power from the MBP. However, at point T12, SBP does encounter a power deficit, shown as point "PD" on the curve, and thus does request MBP to provide assistance power, which consequently drives MBP down to a totally discharged state at T13. Beyond T13, SBP is solely discharged, shown as a broken line because of the low discharge rate, as MBP is at a totally discharged state. At T14, both MBP and SBP are fully discharged and are subsequently charged back to a fully charged state in parallel. A wide variety of power staggering algorithms can be implemented by the MBP/SBP independent multi-battery pack architecture, for EV driver needs, performance, and/or safety.

Span of Design Ratios for Main vs. Supplemental Battery Pack

Figure 5:
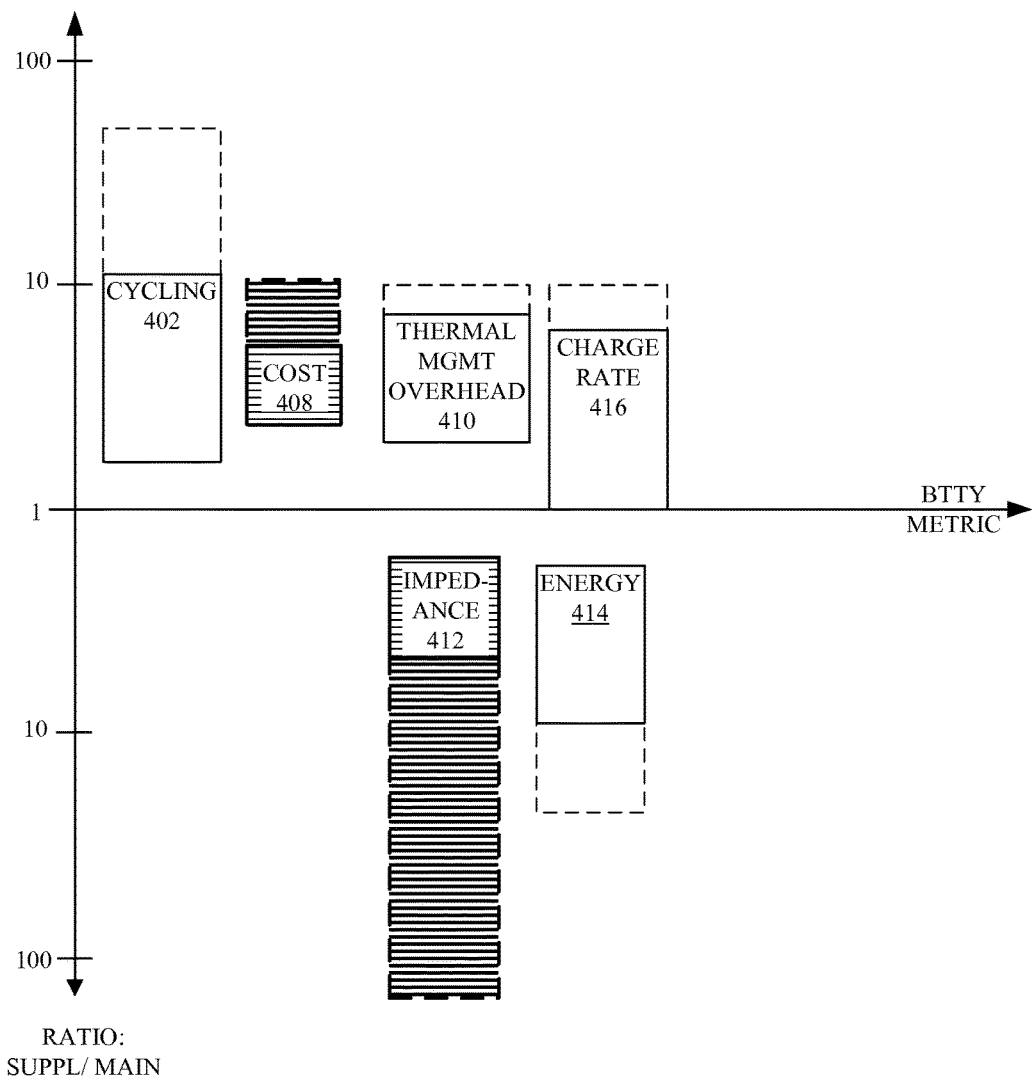
FIG. 5 is a graph illustrating a range of the ratios of design parameters for the main battery pack to those of the supplemental battery pack, respectively, on log-linear axes, according to one or more embodiments.

Referring now to FIG. 5, a graph 500 illustrating a range of the ratios of design parameters for the main battery pack to those of the supplemental battery pack, respectively, on log-linear axes is shown, according to one or more embodiments. The ratios shown are applicable for exemplary battery chemistries of the present embodiment of LiCoO2 and Li2TiO3. However, with the wide variation of battery chemistries currently in existence and in development, the choice of specific factors making up these ratios will change as will the range of the ratios themselves. The graph 500 ordinate is a logarithmic scale from 1 to 10 to 100. A solid line box illustrates a first range of parameters, with an overlapping dashed line box illustrating an optional range of parameters. Positive design parameters are shown in a white box, with negative design parameters shown in a line-patterned box. Parameters on the top half of the graph focus on strong factors of MBP vis-à-vis SBP, while parameters on the bottom half of the graph focus on strong factors of SBP vis-à-vis MBP. Vertical or horizontal alignment or arrangement of ratio ranges does not necessarily indicate a relationship, though one may exist as described below. Some parameters have tradeoffs, or are related to, other parameters, but this depends somewhat upon the uniqueness of the many battery chemistries available. The closer the ratio is to a value of "1," the more similar the MBP to the SBP are, and the less of a potential benefit obtained from tailoring the distinctness between the MBP and SBP to a specific need on an EV. Risk factors can also be multiplied times the ratio ranges, such as considering a failure mode in a complicated active liquid cooling system, which could lead to degradation of the batteries in the SBP, versus a passive air-cooled system, that is very simple, robust, and reliable. As battery designs evolve and solve design issues in some design parameters, some of the ranges of a ratio for a given factor may shrink, as a weak battery design might catch up to a good battery design, while some of the ranges of a ratio might actually grow, as a good battery design gets better and the weak battery design makes no improvement. In other cases, new factors may arise in a formerly matched design parameter as one battery making drastic improvements, Regarding specific ratio ranges, the listed cycling ratio range 402 extends from about 2 to 10 in one embodiment, and from 10 to approximately 80 in another embodiment. In particular, a specific battery chemistry in the present embodiment has an approximate 10:1 to 64:1 ratio range, depending upon the manufacturer and design nuances, with Li2TiO3 MBP having a cycling rate of 3,000 to 16,000 cycles, and with LiCoO2 SBP having a cycling rate of approximately 250 to 500 Future developments in these battery chemistries may result in a change in the specific range of the ratio. Cost ratio 408 ranges from approximately 3 to 10, depending upon the manufacturer and design, where higher cycling ratio ranges tending to have a higher cost range as well. Thermal management overhead range 410 has a partial relationship to impedance 412, because higher impedances typically leading to higher cell temperatures and less thermal stability. To compensate for higher cell temperatures, thermal management overhead range 410 includes the extra cost, complexity, and potential failure modes of a liquid cooled active management system, and the reduced specific energy resulting from the added cooling infrastructure in the battery pack. In the present embodiment, the active liquid cooling system requirement for LiTi2O3 batteries reduces its specific energy by 50%, while the passive cooling system for LiCoO2 only reduces its specific energy by 25%. Impedance ratio range 412 extends from approximately 3 to over 100, which has a substantial effect on the thermal stability. In exemplary DCB, the impedance ratio is 1:120 for LiTi2O3 versus LiCoO2, respectively. The impedance rating of a battery depends upon many factors such as electrical conductivity, mass transfer rate, and chemical reaction. Energy ratio range 414 spans from approximately 2 to 40 in the present embodiment. Energy ratio range is tied to energy density, with the latter also affected by the thermal management overhead ratio range 410 and the need for a space consuming cooling system for low thermal stability batteries. Charge rate (aka, C-rate) ratio 416 has a range that spans from approximately 1 to 10 in the present embodiment, with an exemplary higher-end ratio of 5:1 for a LiTi2O3 maximum C rate of 10 compared to a LiCoO2 maximum C rate of 2. For example, a LiTi2O3 can fast charge as quickly as six minutes in some cases.

Flowcharts

Figure 6A:
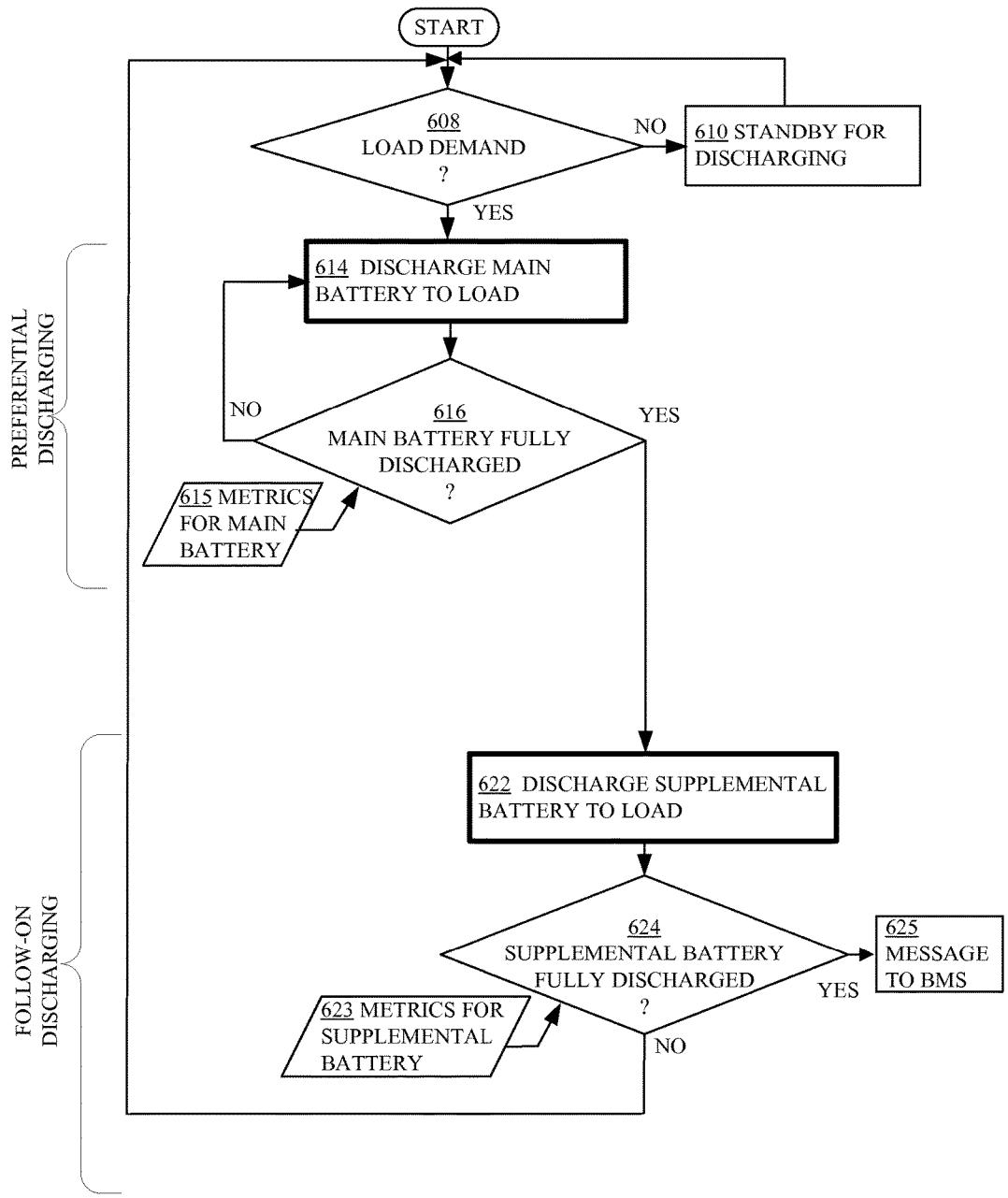
FIG. 6A is a flowchart of a method for discharging a main battery pack to a fully discharged state prior to starting to discharge a supplemental battery pack to a fully discharged state, according to one or more embodiments.
Figure 6B:
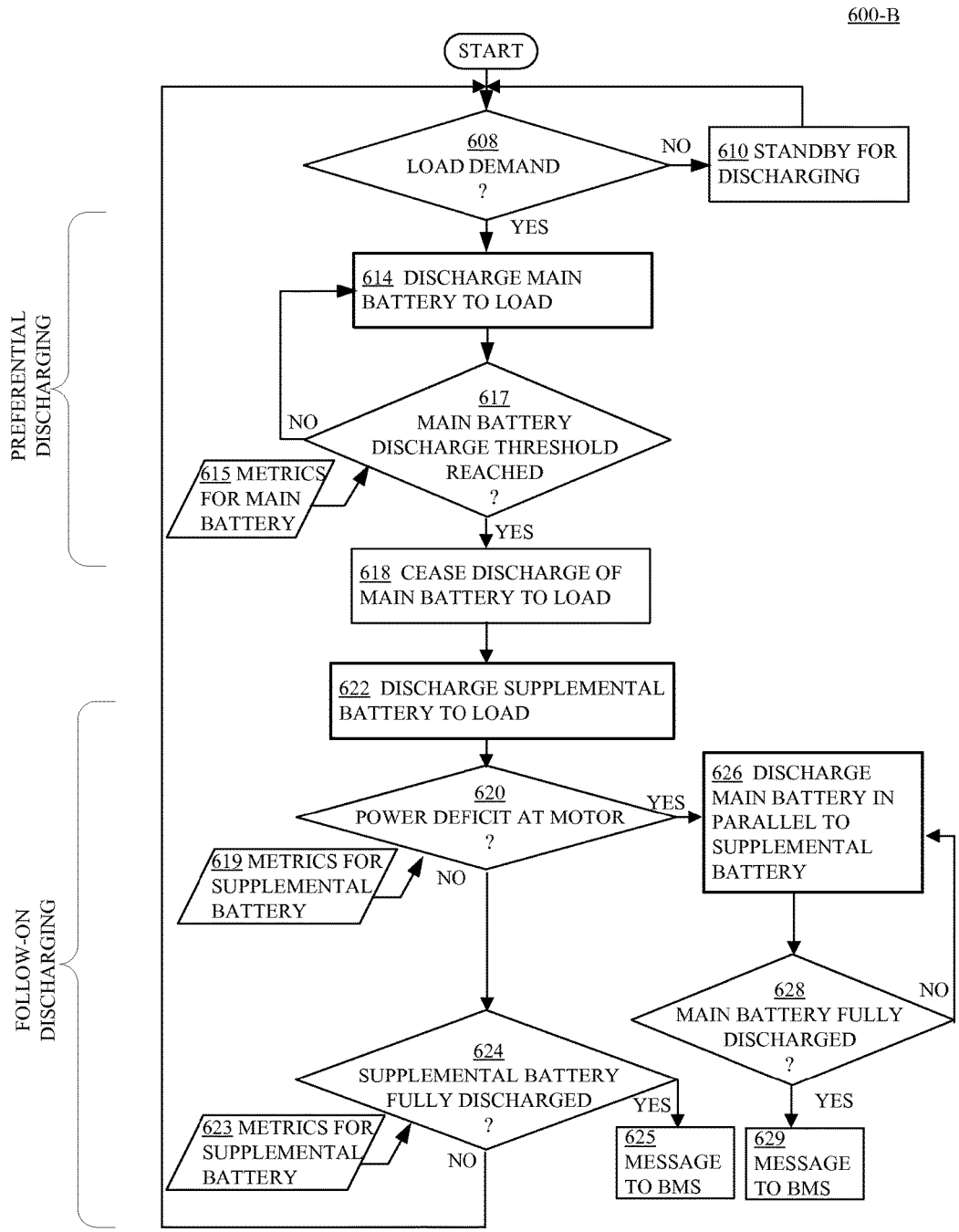
FIG. 6B is a flowchart of a method for discharging a main battery pack to a reserve capacity state prior to starting to discharge a supplemental battery, such that the main battery pack can compensate for a power deficit in the supplemental battery pack, according to one or more embodiments.
Figure 6C:
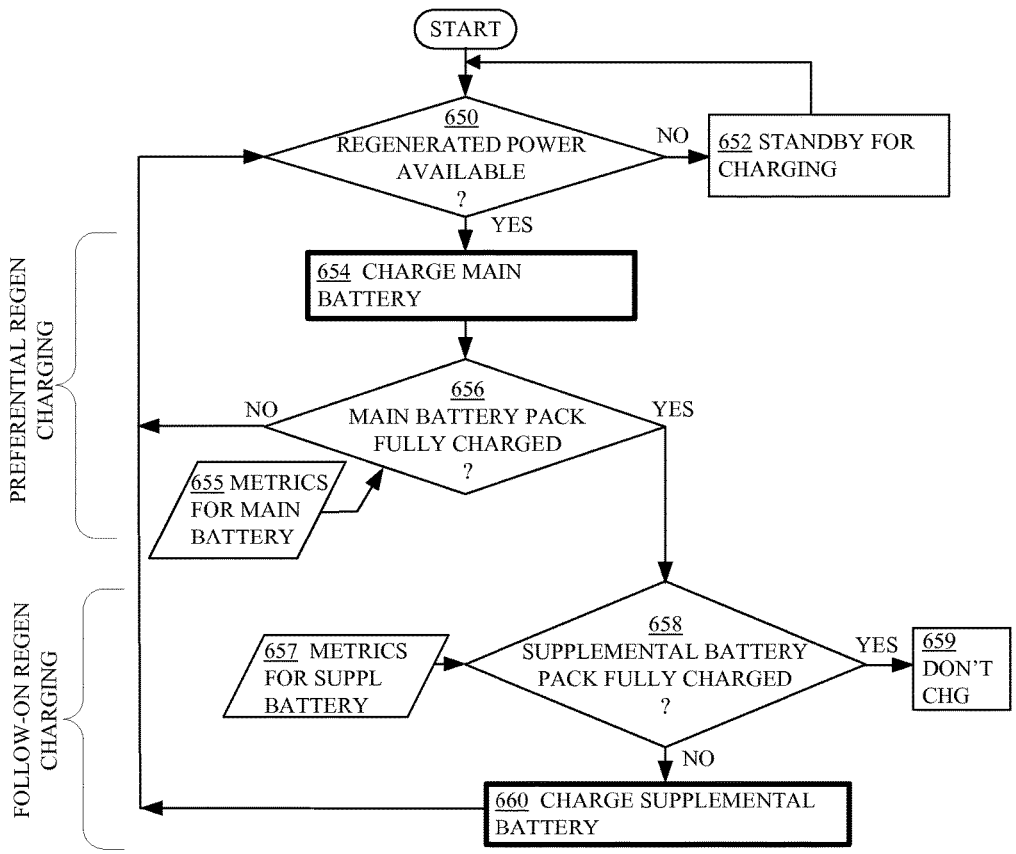
FIG. 6C is a flowchart of a method for regeneratively charging a main battery pack to a fully charged state prior to starting to regeneratively charge a supplemental battery pack to a fully charged state, according to one or more embodiments.

Flowcharts in FIGS. 6A through 6C relate to prior figures as follows. The processes described in FIGS. 6A through 6C utilize the DCB architecture in FIG. 2 which can have a wide range of battery design parameters ratios, as described in FIG. 5, for the MBP/SBP multi-battery subsystem that are tailored, depending upon the application needs such as EV driving schedule combinations, as described in FIGS. 3A-3C and trip SoC graphs described in FIGS. 4A-4C. The operations, inquiries and instructions executed and outputs generated in FIGS. 6A-6C are primarily executed by the battery management system (BMS) 210, and secondarily by the thermal management system (TMS) 220, with some interaction with the powertrain control module (PCM). Operations in a given flowchart with same numbers as other flowcharts utilize those descriptions in the given flowchart. The discharging operations of flowchart 600-A and 600-B flip back and forth with the regen charging operations of flowchart 600-C as needed, depending on the driving scenario, as illustrated in exemplary FIGS. 4B and 4C.

Referring now to FIG. 6A, a flowchart 600-A of a method for discharging a main battery pack to a fully discharged state prior to starting to discharge a supplemental battery pack to a fully discharged state is shown, according to one or more embodiments. The top half of flowchart 600-A, from operation 608 through 616, are bracketed to the left of the figure and labeled as the preferential discharging operations, while the subsequent operations in the bottom half of flowchart 600-A, from operation 622 onwards, are bracketed to the left of the figure and labeled as the follow-on discharging operations. Flowchart 600-A is applicable to the exemplary driving profiles exhibited in FIGS. 4A and 4B, e.g., with decreases in SoC shown as negative slopes, being accomplished by discharge operations hereinafter.

The preferential discharging operations begin with operation 608 which inquires whether a load demand exists, and if not, will standby 610 for the signal, e.g., as initiated from a throttle position sensor. If a load demand exists, the main battery pack is discharged by operation 614 as the preferred source of energy. Preferential priority is an automatic default to closing a switch between the MBP and the load in one embodiment, with a fully depleted MBP being immediately apparent. In another embodiment, preferential priority can be determined by a host of factors, the most significant being that the MBP has any capacity, e.g., the apparent state of charge (SoC) is above approximately 0%. Given the fact, that there are some lag effects in discharging the batteries, there may be residual capacity in the MBP that does not appear after a hard prior discharge. However, the physics of mass flow rate, the chemistry of Brownian motion and exo/endothermic reactions and the thermodynamics of heat transfer from/to the exo/endothermic reactions all have an effect on the behavior of the batteries. Other priority factors could include temperature of the MBP vs. the SBP, with a warmer battery in a cold winter climate being prioritized as more capable of delivering a charge, past cycling history of the MBP vs. the SBP, etc. Inquiry 616 determines whether the main battery is fully discharged or not, based on input 615 of metrics and status of main battery, e.g., SoC, recent history on capacity discharged, existing current rate, temperature of battery, temperature of heat sink (ambient air), etc. A host of algorithms based on specific battery chemistry and vehicle operation can be used to assist decision-making operation 616.

Follow-on discharging operations will arise after the MBP is apparently fully discharged per sensor readings. The follow-on discharging operations begin with operation 622 that discharges the supplemental battery pack (SBP) to the load. This discharge continues until the load ceases, or until the SBP is fully discharged. Even though the SBP is made of a cell that has low specific power, it is designed in the battery pack so as to satisfy the power demands of the load, e.g. the EV electric motor. Thus, each of the multiple battery packs, e.g. the SBP and the MBP, are capable of individually satisfying the power demand of the load, e.g., the EV motor. In the present embodiment flowchart 600-A, the batteries provide that power and energy to the load in sequence, e.g., either the MBP is providing all the power and energy, or the SBP is providing all the power and energy, but both battery packs are not coupled in parallel to both provide power to the load. Inquiry 624 determines whether SBP is fully discharged, based on metrics input 623 from sensor(s) on SBP, e.g., state of charge and temperature readings of battery and cooling system, which is much more important in the SBP because of its higher impedance and consequently higher heat generation. If the SBP is fully discharged or approaching full discharge, operation 625 notices BMS with a message of same. If SBP is not fully discharged and the load remains, then operation 622 continues the discharge. The flowchart returns back up to operation 608 to inquire whether there is a load demand. With the split discharging methodology in flowchart 600-A, as preferential discharging of the MBP and subsequent follow-on discharging of the SBP, the concentration of cycling, e.g., from nominal commute profile, is beneficially focused on the MBP that is best designed for it, with only extended driving profiles causing a fraction of the cycling to occur at the SBP in the vast majority of driving scenarios. There are outlier cases that are not suitable for any typical EV. One example is a driving profile with a consistent commute of sufficient distance and no regeneration that it discharges both the MBP and the SBP every trip, e.g., a long-distance service vehicle, is not sustainable with the current system. However, statistics indicate that the vast majority of typical consumer drivers will benefit from the current DCB architecture and discharge/charge algorithms with extended range for a given comparable battery weight to prior systems, or with reduced weight and/or cost for a DCB battery system Referring now to FIG. 6B, a flowchart 600-B of a method for discharging a main battery pack to a reserve capacity state prior to starting to discharge a supplemental battery, such that the main battery pack can compensate for a power deficit in the supplemental battery pack is shown, according to one or more embodiments. Flowchart 600-B is arranged similarly to flowchart 600-A regarding the top half being preferential discharging operations and the bottom half for follow-on discharging operations. Flowchart 600-B is applicable to the exemplary driving profiles exhibited in FIG. 4C, which illustrate the MBP threshold, THm, and the reserve in the MBP for assisting a potential deficit in SBP.

In contrast to FIG. 6A, flowchart 600-B uniquely utilizes a decision point 617 of a threshold voltage or SoC of the MBP, for transferring the discharge operation from the MBP to the SBP at some point prior to the MBP being fully discharged. The purpose is to retain a reserve capacity in the MBP for future use in compensating the SBP when the SBP has a power deficit, e.g., the current drawn by the load exceeds the capability of the SBP. This goal of reserve capacity in the MBP is accomplished by ceasing to discharge the MBP, at least temporarily, in operation 618 and by then initiating the discharge from the SBP in operation 622. An intermediate inquiry in operation 620 determines whether a power deficit exists in the SBP, and if so, proceeds to operation 626 to discharge the MBP in parallel with discharging the SBP in order to supplement the SBP with additional current. With the MBP discharging, operation 626 proceeds to inquiry 628, which determines whether the main battery is fully discharged, with the help of a metrics input similar to input 615, though not shown for operation 628. If MBP is fully discharged per operation 628, then discharge naturally ceases and operation 629 notices the BMS with a message. With SBP discharging and possibly MBP discharging, flowchart proceeds to inquiry 624 to determine whether the SBP is fully discharged. If so, then BMS is noticed with message per operation 625, and if not, then flowchart returns to load demand inquiry 608. As an alternative to operation 624 having a threshold of full discharge, it could have a supplemental threshold (THs), similar to the MBP threshold, THm, that would cease discharging the SBP and proceed to capture the balance of the MBP reserve, prior to running the SBP to full discharge. Again, the general goal is to discharge the MBP rather than discharging the SBP, and to always discharge the MBP fully, prior to discharging the SBP fully, because the MBP is designed and better-suited to cycling and to fast charge and to high-power, low impedance discharge. Thus, if the price for the MBP is already paid in terms of high-cost and high-weight, then the MBP should be used as the energy and power source mainstay.

Referring now to FIG. 6C, a flowchart 600-C of a method for regeneratively (regen) charging a main battery pack to a fully charged state prior to starting to regeneratively charge a supplemental battery pack to a fully charged state is shown, according to one or more embodiments. Flowchart 600-C is arranged similarly to flowcharts 600-A and 600-B regarding the top half being preferential operations and the bottom half for follow-on operations, albeit for regen charging operations in the present flowchart rather than for discharging operations in the former flowcharts. Flowchart 600-C is applicable to the exemplary driving profiles exhibited in FIGS. 4A-4C, e.g., with increases in SoC shown as positive slopes, that are accomplished by regen charge operations hereinafter.

Regen charging begins with inquiry 650 determining whether regen power is available, and if not, then standing by 652 and repeating the inquiry, e.g., via input from a throttle position and/or brake pedal position sensor in an EV. If regen power is available, then operation 654 preferentially charges the MBP. During the charging, operation 656 inquires whether the main battery pack has reached a threshold value of being fully charged, using input metrics 655 from SoC and current sensors on the MBP. Thresholds other than "fully charged" may be used for different algorithms and applications depending on the battery design and driving profile. If the MBP is not fully charged, then the inquiry 650, charging 654, and inquiry 656 continuously occur. If the MBP is fully charged, then operation 658 inquires whether the SBP is fully charged, using SoC and current sensors as metrics input 657. If the SBP is fully charged, then operation 659 prevents charging, with an optional message to the BMS that both the MBP and the SBP are fully charged. If the SBP is not fully charged, then operation 660 charges the SBP. The process of checking for regen power, checking status of batteries and selectively charging them continues constantly, and with the frequent changes in driving profiles, will respond as indicated in previous driving profile figures.

Charging of MBP and SBP by stationary units is accomplished via a wide variety of means ranging from slow to fast charging, and using various processes, as know by those skilled in the art. Because the SBP has a lower C rating, due to thermal issues, and a larger energy capacity to charge as compared to the MBP, the MBP is more likely to be a higher SoC from a short charging operation. This scenario still accomplishes the goal of preferentially, or always, charging the MBP fully over the SBP when possible, and preferentially, or always, discharging the MBP over the SBP, when possible.

Battery Subsystem and Method Implementation

Based on the architecture of FIG. 2, the battery size tradeoffs for driving profiles of FIGS. 3A-3C, the example driving scenarios discharges and charges of FIGS. 4A-4C, the battery design parameter ratios of FIG. 5, and/or the flowchart processes of FIGS. 6A-6C, one embodiment of a battery subsystem includes: a main battery pack having a cycle rating for a given quantity of cycles over a useful life; a supplemental battery pack having a cycle rating for a given quantity of cycles over a useful life; and a switch coupled to both the main battery pack and the supplemental battery pack. The switch selectively couples the main battery pack or the supplemental battery pack to an electrical load or to an electrical energy source. The cycle rating of the main battery pack is substantially greater than the cycle rating of the supplemental battery pack; and the switch is configured to discharge or charge the main battery pack preferentially over the supplemental battery pack. The main battery pack is configured such that the given quantity of cycles for the useful life of at least approximately 1,000 or 1,500 or 3,000 cycles (depending upon the driving profiles), and in one embodiment, 3,000 to 16,000 cycles; and the useful life is a cycle rating of a quantity of cycles over which an energy capacity of the battery is equal to or greater than approximately 80 percent of an original capacity of the battery. The cycle rating of the main battery pack divided by the cycle rating of the supplemental battery pack results in a cycling ratio; and the cycling ratio is equal to or greater than approximately two (2), but can also be 2-5, 5-10, 10-20, and 20-100 in different battery sizing and chemistry scenarios. The main battery pack and the supplemental battery pack are both configurable to be fully dischargeable to an approximately zero state of charge.

In one embodiment, the main battery pack comprises a plurality of cells coupled to each other, wherein each of the cells of the main battery pack has a chemistry and construction with characteristic impedance; the supplemental battery pack comprises a plurality of cells coupled to each other, wherein each of the cells of the supplemental battery pack has a chemistry and construction with a characteristic impedance; and the characteristic impedance of each of the cells in the main battery pack is lower than the characteristic impedance of each of the cells in the supplemental battery pack. These characteristic impedance values can be normalized for amp-hours to make a fair comparison. The characteristic impedance of the cells in the main battery pack divided by the characteristic impedance of the cells in the supplemental battery pack results in an impedance ratio; and the impedance ratio is equal to or less than approximately 0.5. The main battery pack has an energy rating; the supplemental battery pack has an energy rating; the energy rating of the supplemental battery pack divided by the energy rating of the main battery pack results in an energy ratio; and the energy ratio is configured to be equal to or greater than 2. In other embodiments, the energy ratio can be 2-5, 5-10, 10-100, or as needed for a driving profile combined in different battery sizing and chemistry scenarios. The main battery pack has a maximum C rate; the supplemental battery pack has a maximum C rate; wherein the maximum C rate of the main battery pack is greater than the maximum C rate of the supplemental battery pack. In one embodiment the main battery pack is comprised of a lithium titanium oxide ($Li_2TiO_3$) cell and in another embodiment, the supplemental battery pack is comprised of lithium cobalt ($LiCoO_2$) cell. The main battery pack and the supplemental battery pack have a combined weight that is at least approximately 25% less than a weight of a single battery designed with the chemistry and construction of either the main or supplemental battery pack and with an energy capacity similar to the battery subsystem and a similar cycle rating as the main battery pack.

The battery subsystem above can be managed, in one embodiment, by a method of discharging the main battery pack, which has a cycle rating for a quantity of cycles over a useful life, preferentially before discharging the supplemental battery pack, which has a cycle rating for a quantity of cycles over a useful life; and charging the main battery pack preferentially before charging the supplemental battery pack. The method maintains the useful life of the main battery pack as equivalent to an EV driving life of at least 100,000 miles. The chemistry type of the main battery pack is different from the chemistry type of the supplemental battery pack. The preferential charging the main battery pack occurs if the state of charge of the main battery pack is less than a full charge, regardless of the state of the supplemental battery pack. Some exceptions apply, e.g., when charging the main battery pack is unsafe. The battery design of the MBP and the SBP are different in terms of their ratings of: a thermal profile rating, a cell impedance rating, an energy density rating, or a cycle rating. The main battery pack has a cycle rating that is greater than a cycle rating of the supplemental battery pack, with ranges provided hereinabove.

The main battery pack and the supplemental battery pack can be discharged sequentially. This can be accomplished by selecting a discharge percentage for the main battery pack in a range of 50 to 90 percent; and discharging the main battery pack to the selected discharge percentage prior to starting to discharge the supplemental battery. Other percentage ranges can apply, such as fully discharging the MBP. The preferential charging of the main battery pack from a regenerative energy source occurs before recharging the supplemental battery pack from the regenerative energy source. One sequence of discharging/charging includes: discharging the main battery pack to an approximately depleted state; then discharging the supplemental battery pack; and charging the main battery pack via a regenerative energy source preferentially over the supplemental battery pack; and repeating the discharging of the main battery pack to between 50-95 percent of an original capacity prior to repeating the discharging of the supplemental battery pack. An alternative discharge/charge sequence is to: fully discharge the main battery pack to an approximately zero charge; and then fully discharge the supplemental battery pack to an approximately zero charge. The MBP is discharged more frequently than the SBP in the present embodiment. The MBP and SBP can be configured such that the useful life of the MBP and the useful life of the SBP are equivalent to an EV driving life of at least 100,000 miles. This is done by configuring the MBP to be fully dischargeable to an approximately zero charge a number of times over its useful life approximately equal to a cycle rating of the main battery pack; and the supplemental battery pack can be configured to be fully dischargeable to an approximately zero charge a number of times over its useful life approximately equal to a cycle rating of the supplemental battery pack. The number of times the main battery pack is fully dischargeable divided by the number of times the supplemental battery pack is fully dischargeable results in a discharge ratio that is approximately equal to a cycling ratio. Overall, the MBP and the SBP are configured to be fully dischargeable while maintaining a lifetime cycling of the battery subsystem of approximately equivalent to an EV driving life of at least 100,000 miles.

Modeling Results and Conclusions

Below are several tables that provide five exemplary battery combinations to illustrate the potential savings of the present disclosure over existing battery architectures and discharge/charge algorithms.

Target vehicle 1 (as it is a production car from a large automobile manufacturer) is a real world reference. The stated range is: 82 miles for a 20 kWh pack. This car has a 100 kW motor, and weighs 3,300 lb. It is a 4 seater small sedan. Vehicle 2 is similar but the stated range is: 73 miles for a 24 kWh pack, uses a 80 kW motor and weighs 3,400 lb. It is a 4 seater small sedan.

TABLE 1

This shows the key attributes of the chosen cells from which the packs will be designed. Note there are 3 LTO cells types and 2 Hi-Energy cell types.

| Key Battery attributes | LTO1 | LTO2 | LTO3 | LiCo | LiS |
|---|---|---|---|---|---|
| Voltage (V) | 2.3 | 2.3 | 2.3 | 3.6 | 2.2 |
| Max Voltage (V) | 2.7 | 2.7 | 2.7 | 3.9 | 2.4 |
| Min Voltage (V) | 2.0 | 2.0 | 1.5 | 2.5 | 2.0 |
| capacity (Ah) | 13.4 | 64.0 | 20 | 3.1 | 2.5 |
| std charge (A) | 13.0 | 50.0 | 20 | 1.7 | |
| fast charge (A) | 130.0 | 360.0 | 160 | 3.1 | 0.5 |
| std discharge (A) | 13.0 | 50.0 | 20 | 3.1 | |
| fast discharge (A) | 130.0 | 360.0 | 160 | 6.2 | 5.0 |
| pulse discharge (A) | 260.0 | 600.0 | 300 | 12.0 | 10.0 |
| weight (kg) | 0.40 | 1.84 | 0.53 | 0.05 | 0.02 |
| impedance (mOhm) | 1.50 | 0.40 | 1.10 | 55.00 | 25.00 |
| size (l) | 0.20 | 0.84 | 0.26 | 0.03 | 0.02 |
| std charge (C) | 1.0 | 1.0 | 1.0 | 0.5 | |
| fast charge (C) | 10.0 | 6.0 | 8.0 | 1.0 | 0.2 |
| std discharge (C) | 1.0 | 1.0 | 1.0 | 1.0 | |

TABLE 1-continued

This shows the key attributes of the chosen cells from which the packs will be designed. Note there are 3 LTO cells types and 2 Hi-Energy cell types.

| Key Battery attributes | LTO1 | LTO2 | LTO3 | LiCo | LiS |
|---|---|---|---|---|---|
| fast discharge (C) | 10.0 | 6.0 | 8.0 | 2.0 | 2.0 |
| Typ energy (Wh) | 29 | 116 | 46 | 11 | |
| Peak power (W) | 670 | 1,250 | 170 | | |
| Specific Energy - Wh/kg | 73 | 77 | 86 | 248 | 350 |
| Energy Density - Wh/l | 137 | 168 | 177 | 675 | 320 |
| Specific Power - W/kg | 1,675 | 1,333 | | 465 | |
| Power Density - W/l | 3,182 | 2,916 | | 656 | |
| Cycle life | 16,000 | 16,000 | 4,000 | 250 | 400 |

Referring to Table 2 below, the chosen combinations of cells in series to achieve the target voltage, and in parallel to achieve the target current. A secondary objective is to achieve the capacity required to meet the range of the vehicle when the two packs are combined. Here the first objective is to size P1, the main battery pack, so that approx 35-40 miles is possible, targeting a daily commute, and then P2, the supplemental battery pack, is sized to meet the target range. Note how LTO3 is the pack in the reference vehicle 1, and so all range variations are referenced from this vehicle. The key values derived here are in turn used in the following table to design the dual chemistry pack.

TABLE 2

Pack configurations for Target Vehicle: 100-mile range, 100 kW motor, Motor voltage range 400-260 V, life - 10 yr or 100,000 miles

| | LTO1 | LTO2 | LTO3 | LiCo | LiS |
|---|---|---|---|---|---|
| Max cells in series | 148 | 148 | 173 | 104 | 167 |
| Min cells in series | 130 | 130 | 148 | 103 | 130 |
| Max Power (W) | 104,000 | 240,000 | 120,000 | 4,800 | 4,000 |
| Min Power (W) | 67,600 | 156,000 | 78,000 | 3,120 | 2,600 |
| Min Energy Capacity (Wh) | 4,007 | 19,136 | 7,973 | 1,161 | 699 |
| Cells in parallel for 100 kW | 1 | 1 | 1 | 21 | 25 |
| New min capacity (Wh) | 4,007 | 19,136 | 7,973 | 24,373 | 17,469 |
| Min Pack size multiplier | 2 | 1 | 1 | 1 | 1 |
| max power (W) | 208,000 | 240,000 | 120,000 | 100,800 | 100,000 |
| min power (W) | 135,200 | 156,000 | 78,000 | 65,520 | 65,000 |
| min capacity Wh | 8,013 | 19,136 | 7,973 | 24,373 | 17,469 |
| min Weight (kg) | 104 | 239 | 92 | 105 | 52 |
| Total Pack Weight (kg) | 155 | 357 | 137 | 233 | 116 |
| Total Cell Volume (liters) | 52 | 109 | 45 | 74 | 75 |
| Pack volume (liters) | 80 | 168 | 69 | 165 | 166 |
| Current/string (Amps) | 83.6 | 167.2 | 125.4 | 6.4 | 7.2 |
| lost power/string (W) | 1,363.2 | 1,454.1 | 2,999.1 | 231.3 | 166.4 |
| losses @ 50 kW | 5.5% | 2.9% | 6.0% | 9.7% | 8.3% |
| Miles/kWh | 4.1894 | 4.6068 | 4.1000 | 3.4903 | 3.7192 |
| Range (miles) | 33.6 | 88.2 | 32.7 | 85.1 | 65.0 |

Range/eff Factor 4

TABLE 3

Pack Combinations

| | A<br>LTO1 +<br>LiS | B<br>LTO1 +<br>LiCo | C<br>LTO2 +<br>LiS | D<br>LTO2 +<br>LiCo | E<br>LTO3 +<br>LiS | F<br>Veh1 | G<br>Veh2 |
|---|---|---|---|---|---|---|---|
| Weight (kg) | 271 | 388 | 473 | 590 | 253 | 344 | 300 |
| Capacity (kWh) | 25.5 | 32.4 | 36.6 | 43.5 | 25.4 | 20 | 24 |
| range (miles) | 102.6 | 127.2 | 160.9 | 186.8 | 101.0 | 82 | 73 |
| max power P1 (W) | 182,520 | 182,520 | 210,600 | 210,600 | 140,400 | 100,000 | 80,000 |
| max power P2 (W) | 78,000 | 102,211 | 78,000 | 101,400 | 78,000 | | |
| Life P1 (years)** | 51 | 51 | 131 | 131 | 12.8 | 26 | 10 |
| Life P2 (years)** | 16 | 13 | | | 11 | | |
| Volume (L) | 246 | 245 | 335 | 333 | 235 | 172 | 918 |
| Pack Wh/kg | 94 | 83 | 77 | 74 | 101 | 58 | |
| Pack Wh/l | 104 | 132 | 109 | 130 | 108 | 116 | |
| Ratio P2:P1 | 2.2 | 3.0 | 0.9 | 1.3 | 2.2 | | |

TABLE 3-continued

Pack Combinations

|  | Pack combinations | | | | | | |
|---|---|---|---|---|---|---|---|
|  | A<br>LTO1 +<br>LiS | B<br>LTO1 +<br>LiCo | C<br>LTO2 +<br>LiS | D<br>LTO2 +<br>LiCo | E<br>LTO3 +<br>LiS | F<br>Veh1 | G<br>Veh2 |
| 100% m/kWh | 4.0 | 3.9 | 4.4 | 4.3 | 4.0 | 4.1 | 3.0 |
| Typical m/kWh | 4.2 | 4.2 | 4.6 | 4.6 | 4.1 |  |  |
| Est. pack cost ($)* | $16,748 | $20,200 | $27,870 | $31,323 | $16,708 | $20,000 | $18,000 |
| Range/pack weight | 0.38 | 0.33 | 0.34 | 0.32 | 0.40 | 0.24 | 0.24 |
| Range/pack cost | 0.0061 | 0.0063 | 0.0058 | 0.0060 | 0.0060 | 0.0041 | 0.0041 |
| $/kWh | $ 657 | $ 624 | $ 761 | $ 720 | $ 657 | $ 1,000 | $ 750 |

**Life: Assume 40 miles/day, 6 days/week = 12,480 miles/year
*Cost: Assume P1(LTO) = $1000/kWh, and P2(Hi En) is $500/kWh For reference, published data is shown for vehicle 1 & 2 (F & G) are single chemistry packs. The other packs are all dual chemistry. The stated costs numbers are based on input from vendors and research for both LTO cells and the LiCo and LiS cell. Furthermore, the LiS cell is not yet in mass production but does serve as a good indicator of battery types that may be available shortly. The last 3 rows show normalized range by cost or weight of the pack, and cost per kWh. These ratios are the best indicators of which packs perform the best. Pack A/B/E makes the best option: Smaller LTO and high-energy combination.

Pack 'A' will not meet max power need from P2 but can be mitigated as described above. However, it is the lowest cost pack and most closely achieves the 100-mile specification.

Pack 'B' will meet power need from P1 or P2 but has a larger more expensive pack, which exceeds the range spec. However, this pack has the best range normalized for either cost or weight. Therefore, this pack is the best choice to meet the target specification.

'E' will also not meet max power from P2 alone, but has the highest range normalized by weight since both LTO3 and LiS cells have the best energy density by weight.

As expected the single packs (F&G) have the worst range performance numbers. Another important item to bear in mind is the ratio of P2:P1. Typically P1 (LTO) should be smaller by a ratio of somewhere between 3:1 to 5:1, and larger packs can have a higher ratio (Higher percentage of hi-energy, low cost battery) which will make the total pack lower in cost and weight.

CONCLUSIONS

TABLE 4

Comparison

|  | Comparison | | | |
|---|---|---|---|---|
|  | W<br>B vs. Veh1 | X<br>B vs. Veh2 | Y<br>E vs. Veh1 | Z<br>A vs. Veh2 |
| Range | 155% | 174% | 123% | 125% |
| weight | 113% | 129% | 73% | 79% |
| cost | 101% | 112% | 84% | 84% |
| volume | 142% | 27% | 137% | 143% |
| Capacity | 162% | 135% | 127% | 127% |
| Range/cost | 154% | 155% | 147% | 149% |
| Range/weight | 137% | 135% | 168% | 159% |

With packs A/B/E vs. the single pack, there is an approx 50% advantage in range when cost is fixed or weight is fixed. This is indeed the most important conclusion and most compelling deduction from this analysis.

The present invention is well suited to using different combinations of different battery types including: sodium-ion, lithium sulfur, Lithium manganese oxide, lithium iron phosphate, lithium manganese spinel, etc.

Implementations

Methods and operations described herein can be in different sequences than the exemplary ones described herein, e.g., in a different order. Thus, one or more additional new operations may be inserted within the existing operations or one or more operations may be abbreviated or eliminated, according to a given application.

Other features of the present embodiments will be apparent from the accompanying drawings and from the detailed description. In addition, it will be appreciated that the various operations, processes, and methods disclosed herein may be carried out, at least in part, by processors and/or electrical user interface controls under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium.

The foregoing descriptions of specific embodiments of the present disclosure have been presented for purposes of illustration and description. They are not intended to be exhaustive or to limit the invention to the precise forms disclosed. Many modifications and variations are possible in light of the above teaching without departing from the broader spirit and scope of the various embodiments. The embodiments were chosen and described in order to explain the saliently significant principles of the invention and its practical application in the best way, and to enable others skilled in the art to best utilize the invention and various embodiments with various modifications as are suited to the particular use contemplated. It is intended that the scope of the invention be defined by the Claims appended hereto and their equivalents.

We claim:

1. A battery subsystem comprising:
   a main battery pack having a cycle rating for a given quantity of cycles over a useful life;
   a supplemental battery pack having a cycle rating for a given quantity of cycles over a useful life;
   a switch coupled to both the main battery pack and the supplemental battery pack, wherein the switch selectively couples the main battery pack or the supplemental battery pack to an electrical load or to an electrical energy source;
   wherein the cycle rating of the main battery pack is substantially greater than the cycle rating of the supplemental battery pack; and
   wherein the switch is configured to discharge or charge the main battery pack preferentially over the supplemental battery pack.

2. The battery subsystem of claim 1 wherein:
   the cycle rating of the main battery pack divided by the cycle rating of the supplemental battery pack results in a cycling ratio; and
   the cycling ratio is equal to or greater than approximately two.

3. The battery subsystem of claim 1 wherein:
   the main battery pack and the supplemental battery pack are both fully dischargeable to an approximately zero state of charge in an electric vehicle driving scenario.

4. The battery subsystem of claim 3 wherein:
   the main battery pack is configured such that the given quantity of cycles for the useful life of at least 3,000 cycles; and
   the useful life is a cycle rating of a quantity of cycles over which an energy capacity of the battery is equal to or greater than approximately 80 percent of an original capacity of the battery.

5. The battery subsystem of claim 3 wherein:
   the main battery pack comprises a plurality of cells coupled to each other, wherein each of the cells of the main battery pack has a chemistry and construction with characteristic impedance;
   the supplemental battery pack comprises a plurality of cells coupled to each other, wherein each of the cells of the supplemental battery pack has a chemistry and construction with a characteristic impedance; and
   the characteristic impedance of each of the cells in the main battery pack is lower than the characteristic impedance of each of the cells in the supplemental battery pack.

6. The battery subsystem of claim 5 wherein:
   the characteristic impedance of the cells in the main battery pack divided by the characteristic impedance of the cells in the supplemental battery pack results in an impedance ratio; and
   the impedance ratio is equal to or less than approximately 0.5.

7. The battery subsystem of claim 3 wherein:
   the main battery pack has an energy rating;
   the supplemental battery pack has an energy rating;
   the energy rating of the supplemental battery pack divided by the energy rating of the main battery pack results in an energy ratio; and
   the energy ratio is configured to be equal to or greater than 2.

8. The battery subsystem of claim 3 wherein:
   the main battery pack has a maximum discharge rate (C-rate);
   the supplemental battery pack has a maximum C-rate; and
   the maximum C-rate of the main battery pack is greater than the maximum C-rate of the supplemental battery pack.

9. The battery subsystem of claim 3 wherein:
   the main battery pack and the supplemental battery pack have a combined weight that is at least approximately 25% less than a weight of a single battery designed with the chemistry and construction of either the main or supplemental battery pack and with an energy capacity similar to the battery subsystem and a similar cycle rating as the main battery pack.

10. The battery subsystem of claim 1 wherein:
    the main battery pack is comprised of a lithium titanium oxide ($Li_2TiO_3$) cell; and
    the supplemental battery pack is comprised of a lithium cobalt oxide ($LiCoO_2$) cell.

11. The battery subsystem of claim 1 wherein:
    the main battery pack and the supplemental battery pack are configured to not transfer charge between each other.

12. The battery subsystem of claim 1 wherein:
    the main battery pack is configured to be fully discharged to an approximately zero charge first; and
    the supplemental battery pack is configured to be fully discharging an approximately zero charge second.

13. The battery subsystem of claim 1 further comprising:
    a heating/cooling system for the main battery pack; and
    a heating/cooling system for the supplemental battery pack; and wherein:
      the heating/cooling system for the main battery pack is independent and different from the heating/cooling system for the supplemental battery pack.

14. The battery subsystem of claim 1 further comprising:
    a battery management system (BMS); and wherein:
    the BMS is configured to recharge the main battery pack from regenerative power, preferentially or exclusively, with respect to the supplemental battery pack.

15. A method of cycling a battery subsystem having a main battery pack and a supplemental battery pack selectively coupled to an electrical load and an electrical energy source by a switch, the method comprising:
    discharging the main battery pack, which has a cycle rating for a quantity of cycles over a useful life, via the switch preferentially before discharging the supplemental battery pack, which has a cycle rating for a quantity of cycles over a useful life;
    charging the main battery pack via the switch preferentially before charging the supplemental battery pack; and
    wherein:
      the cycle rating of the main battery pack is substantially greater than the cycle rating of the supplemental battery pack.

16. The method of claim 15 wherein preferentially charging the main battery pack occurs if a state of charge of the main battery pack is less than a full charge, regardless of a state of charge of the supplemental battery pack.

17. The method of claim 15 wherein:
    the main battery pack has a battery design rating;
    the supplemental battery pack has a battery design rating;
    the battery design rating of the main battery pack is different than the battery design rating of the supplemental battery pack; and
    the battery design rating is at least one of a thermal profile rating, a cell impedance rating, an energy density rating, and a cycle rating.

18. The method of claim 17 wherein:
the main battery pack has a cycle rating that is greater than a cycle rating of the supplemental battery pack.

19. The method of claim 17 further comprising:
configuring the main battery pack and the supplemental battery pack to be fully dischargeable while maintaining a lifetime cycling of the battery subsystem of approximately equivalent to an EV driving life of at least 100,000 miles.

20. The method of claim 15 further comprising:
discharging the main battery pack and the supplemental battery pack sequentially.

21. The method of claim 20 further comprising:
selecting a discharge percentage for the main battery pack in a range of 50 to 90 percent; and
discharging the main battery pack to the selected discharge percentage prior to starting to discharge the supplemental battery pack.

22. The method of claim 15 further comprising:
selectively discharging the main battery pack and the supplemental battery pack sequentially or parallely with respect to each other, depending upon a mode of battery consumption detected.

23. The method of claim 15 further comprising:
preferentially charging the main battery pack from a regenerative energy source before recharging the supplemental battery pack from the regenerative energy source.

24. The method of claim 15 further comprising:
discharging the main battery pack to an approximately depleted state;
then discharging the supplemental battery pack; and
charging the main battery pack via a regenerative energy source preferentially over the supplemental battery pack; and
repeating the discharging of the main battery pack to between 50-95 percent of an original capacity prior to repeating the discharging of the supplemental battery pack.

25. The method of claim 15 further comprising:
fully discharging the main battery pack to an approximately zero charge; and
then fully discharging the supplemental battery pack to an approximately zero charge.

26. The method of claim 15 further comprising:
discharging the main battery pack more frequently than the supplemental battery pack.

27. The method of claim 15 further comprising:
configuring the main battery pack to be fully dischargeable to an approximately zero charge a number of times over its useful life approximately equal to the cycle rating of the main battery pack;
configuring the supplemental battery pack to be fully dischargeable to an approximately zero charge a number of times over its useful life approximately equal to the cycle rating of the supplemental battery pack; and
wherein:
the number of times the main battery pack is fully dischargeable divided by the number of times the supplemental battery pack is fully dischargeable results in a discharge ratio that is approximately equal to a cycling ratio; and
the useful life of the main battery pack and the useful life of the supplemental battery pack are equivalent to an EV driving life of at least 100,000 miles.

28. The method of claim 15, wherein:
the main battery pack is comprised of a plurality of cells having a chemistry type;
the supplementary battery pack is comprised of a plurality of cells having a chemistry type; and
the chemistry type of the main battery pack is different from the chemistry type of the supplemental battery pack.

29. An energy management system comprising:
an electric load;
an electrical energy source;
a battery subsystem coupled to the electric load and the electrical power source;
a battery management system (BMS) coupled to the battery subsystem, wherein the BMS includes a microcontroller configured to implement an algorithm for charging and discharging the main battery pack and the supplemental battery pack; and
a temperature management system (TMS) coupled to the battery subsystem, wherein the TMS includes a microcontroller configured to implement an algorithm for charging and discharging the main battery pack and the supplemental battery pack; and
wherein the battery system comprises:
a main battery pack having a cycle rating for a given quantity of cycles;
a supplemental battery pack having a cycle rating for a given quantity of cycles;
a switch coupled to both the main battery pack and the supplemental battery pack, wherein the switch selectively couples the main battery pack or the supplemental battery pack to an electrical load or to an electrical energy source; and
wherein:
the cycle rating of the main battery pack is substantially greater than the cycle rating of the supplemental battery pack; and
the switch is configured to discharge the main battery pack preferentially over the supplemental battery pack.

30. The energy management system of claim 29 wherein:
the electrical load is an electric motor in an electric vehicle (EV); and
the TMS comprises:
a cooling/heating system for the main battery pack; and
a cooling/heating system for the supplemental battery pack; and
the heating/cooling system for the main battery pack is independent and different from the cooling system used for the supplemental battery pack.

31. The energy management system of claim 30 wherein:
the cooling system of the main battery pack is a passive air cooled system; and
the cooling system of the supplemental battery pack is an active liquid cooled system.

32. The energy management system of claim 30 wherein the main battery pack has a power and an energy capacity sufficient to provide approximately all the performance needed for a nominal commuting profile such that no more than approximately 20% of the energy from the supplemental battery pack is needed.

33. The energy management system of claim 27 wherein the supplemental battery pack is sized for an energy capacity sufficient for an extended driving profile, wherein the extended driving profile begins after exercising the nominal commuting profile up to a maximum driving range.

34. The energy management system of claim 27 wherein:
the battery subsystem has a combined weight equal to a weight of the main battery pack plus a weight of the supplemental battery pack;
the battery subsystem has a sufficient cycle rating to provide a projected lifetime of at least 100,000 EV miles at the nominal commuting profile and the extended driving profile; and
the weight of the battery subsystem is at least approximately 25 percent less than a weight of a single battery design, subsystem having a homogeneous chemistry of either the main or supplemental battery pack, with sufficient cycle rating to provide the projected lifetime of driving cycles of the EV at the given commuting profile and the extended driving profile, corresponding to at least 100,000 miles.

35. The battery subsystem system of claim 30 wherein:
the main battery pack and the supplemental battery pack are both configured to be fully dischargeable; and
the main battery pack and the supplemental battery pack provide a lifetime usage of 100,000 miles of nominal EV driving schedules.

36. The energy management system of claim 29 wherein the BMS is configured to recharge the main battery pack from regenerative power, preferentially or exclusively, with respect to the supplemental battery pack.

* * * * *